(12) United States Patent
Meng

(10) Patent No.: US 9,414,131 B2
(45) Date of Patent: Aug. 9, 2016

(54) HIGH SPEED CIRCUIT BOARD TO CIRCUIT BOARD CONNECTOR VIA MATING IN AN ORTHOGONAL DIRECTION TO THE AXIS OF THE PINS

(71) Applicant: Lenovo Enterprise Solutions (Singapore) Pte. Ltd., Singapore (SG)

(72) Inventor: Jian Meng, Kanata (CA)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/301,196

(22) Filed: Jun. 10, 2014

(65) Prior Publication Data

US 2015/0358694 A1    Dec. 10, 2015

(51) Int. Cl.
*H01R 12/00*  (2006.01)
*H04Q 1/02*  (2006.01)
*H01R 12/70*  (2011.01)
*H01R 12/73*  (2011.01)

(52) U.S. Cl.
CPC ........... *H04Q 1/155* (2013.01); *H01R 12/7005* (2013.01); *H01R 12/732* (2013.01)

(58) Field of Classification Search
CPC .......................... H04Q 1/155; H01R 12/7005
USPC ........ 439/64, 65, 377, 608, 342, 376, 607.01, 439/632, 638, 631, 634
See application file for complete search history.

(56) References Cited

U.S. PATENT DOCUMENTS

| 4,445,740 | A  | * | 5/1984 | Wallace ........................ 439/152 |
| 6,431,886 | B1 | * | 8/2002 | Ramey ................. H01R 12/716 439/101 |
| 6,592,409 | B1 | * | 7/2003 | Oehme et al. ................. 439/680 |
| RE45,034  | E  | * | 7/2014 | Babin ............................ 361/759 |
| 2002/0160658 | A1 | * | 10/2002 | Sipe .............................. 439/608 |
| 2003/0203676 | A1 | * | 10/2003 | Hasircoglu .................... 439/608 |
| 2005/0245105 | A1 | * | 11/2005 | Driscoll et al. .................. 439/65 |
| 2007/0119792 | A1 | * | 5/2007 | Hendrix et al. ................. 211/26 |
| 2009/0149041 | A1 |   | 6/2009 | Morlion et al. |
| 2009/0233459 | A1 |   | 9/2009 | Shiramizu et al. |
| 2010/0178779 | A1 | * | 7/2010 | Davis et al. ..................... 439/65 |
| 2010/0304581 | A1 | * | 12/2010 | Davis et al. ..................... 439/65 |
| 2011/0207342 | A1 | * | 8/2011 | Davis .............................. 439/65 |
| 2014/0098508 | A1 | * | 4/2014 | Dunham ....................... 361/791 |
| 2014/0099844 | A1 | * | 4/2014 | Dunham ....................... 439/887 |
| 2015/0084489 | A1 | * | 3/2015 | Doglio et al. ............. 312/223.2 |

FOREIGN PATENT DOCUMENTS

| EP | 1158615 | 11/2001 |
| JP | 02003264015 | 9/2003 |
| WO | WO2012035030 | 3/2012 |

OTHER PUBLICATIONS

Chou et al., "Robust free space board-to-board optical interconnect with closed loop MEMS tracking," Applied Physics A, vol. 95, 2009, pp. 973-982.
Nanayakkara et al., "Improving the fracture resistance of sandwich composite T-joints by z-pinning," Composite Structures, vol. 96, 2013, pp. 207-215.

* cited by examiner

*Primary Examiner* — Tulsidas C Patel
*Assistant Examiner* — Peter G Leigh
(74) *Attorney, Agent, or Firm* — Zilka-Kotab, PC

(57) ABSTRACT

A system according to one embodiment includes a printed circuit board; and a connector coupled to the printed circuit board. The connector has a plurality of pins extending therefrom along a first direction. The connector has guides configured to guide a mating connector along a second direction oriented perpendicular to the first direction.

20 Claims, 5 Drawing Sheets

HIGH SPEED CIRCUIT BOARD TO CIRCUIT BOARD CONNECTOR VIA MATING IN AN ORTHOGONAL DIRECTION TO THE AXIS OF THE PINS

BACKGROUND

The present invention relates to circuit board to circuit board connection, and more specifically, this invention relates to high speed connectors of circuit boards.

As the signal lane density on Ethernet switches increases over time, high speed signal lanes are placed on all four sides of devices. It has become advantageous to route the high speed signal lanes on circuit boards as short as possible in order to minimize signal loss and gain the best possible signal integrity. Current circuit board designs are limited in their high insertion losses and long traces, due to the fact that their male to female connector pins are restricted to coupling in a direction parallel to the axis of the pins.

Due to these higher insertion losses, circuit boards must typically be equipped with additional buffer devices. Additional buffer devices not only significantly increase the material cost of the device, they also take up additional space on the device, thus limiting the size capabilities of circuit boards.

BRIEF SUMMARY

A system according to one embodiment includes a printed circuit board; and a connector coupled to the printed circuit board. The connector has a plurality of pins extending therefrom along a first direction. The connector has guides configured to guide a mating connector along a second direction oriented perpendicular to the first direction.

A system according to a further embodiment includes a printed circuit board; and a connector fixedly coupled to the printed circuit board. The connector has a plurality of pins extending therefrom along a first direction and guides configured to guide a mating connector along a second direction oriented perpendicular to the first direction, wherein the mating connector has a plurality of mating pins extending therefrom along the first direction, the mating pins engaging the pins when the connector and mating connector are coupled together, A second printed circuit board has the mating connector coupled thereto, the connector and mating connector being coupled together. The printed circuit board and the second printed circuit board are configured to operate as at least a portion of a network switch when the connector and mating connector are coupled together.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems for high speed circuit board to circuit board connection via mating in an orthogonal direction to the axis of the pins.

In one general embodiment, a system includes a printed circuit board; and a connector coupled to the printed circuit board. The connector has a plurality of pins extending therefrom along a first direction. The connector has guides configured to guide a mating connector along a second direction oriented perpendicular to the first direction.

In another general embodiment, a system includes a printed circuit board; and a connector fixedly coupled to the printed circuit board. The connector has a plurality of pins extending therefrom along a first direction and guides configured to guide a mating connector along a second direction oriented perpendicular to the first direction, wherein the mating connector has a plurality of mating pins extending therefrom along the first direction, the mating pins engaging the pins when the connector and mating connector are coupled together, A second printed circuit board has the mating connector coupled thereto, the connector and mating connector being coupled together. The printed circuit board and the second printed circuit board are configured to operate as at least a portion of a network switch when the connector and mating connector are coupled together.

Figure 1:
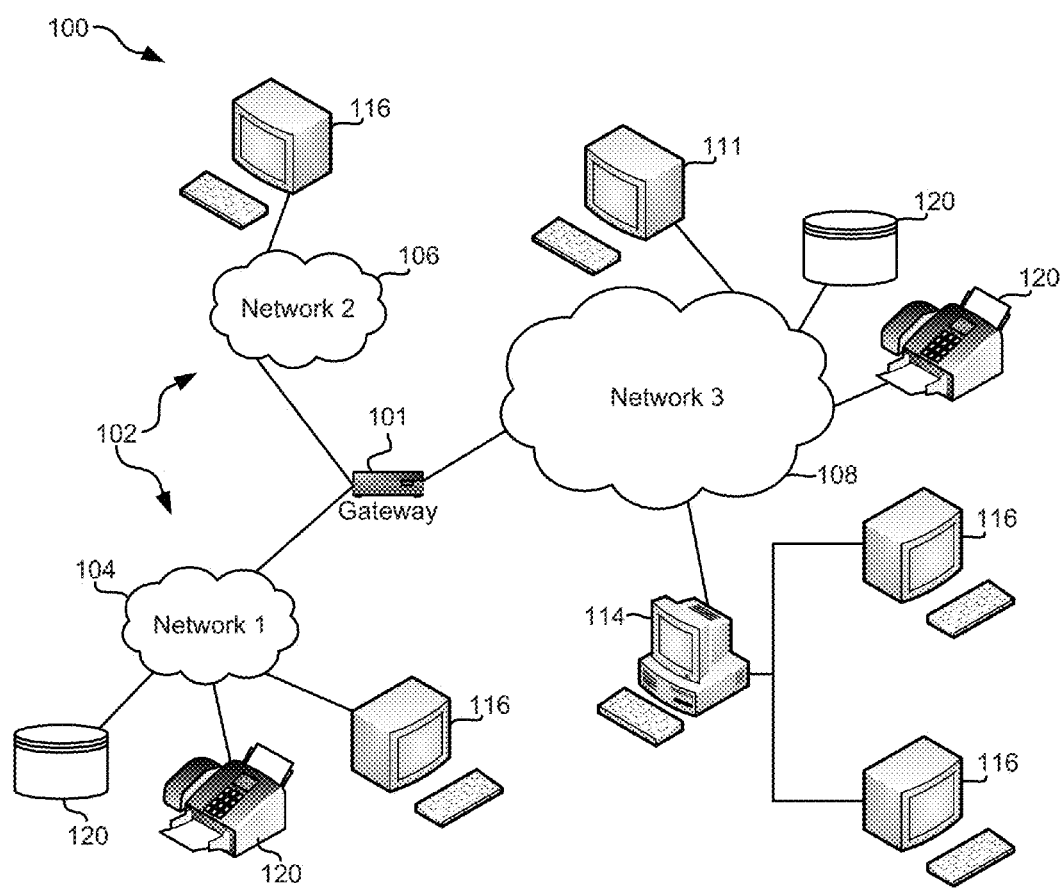
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
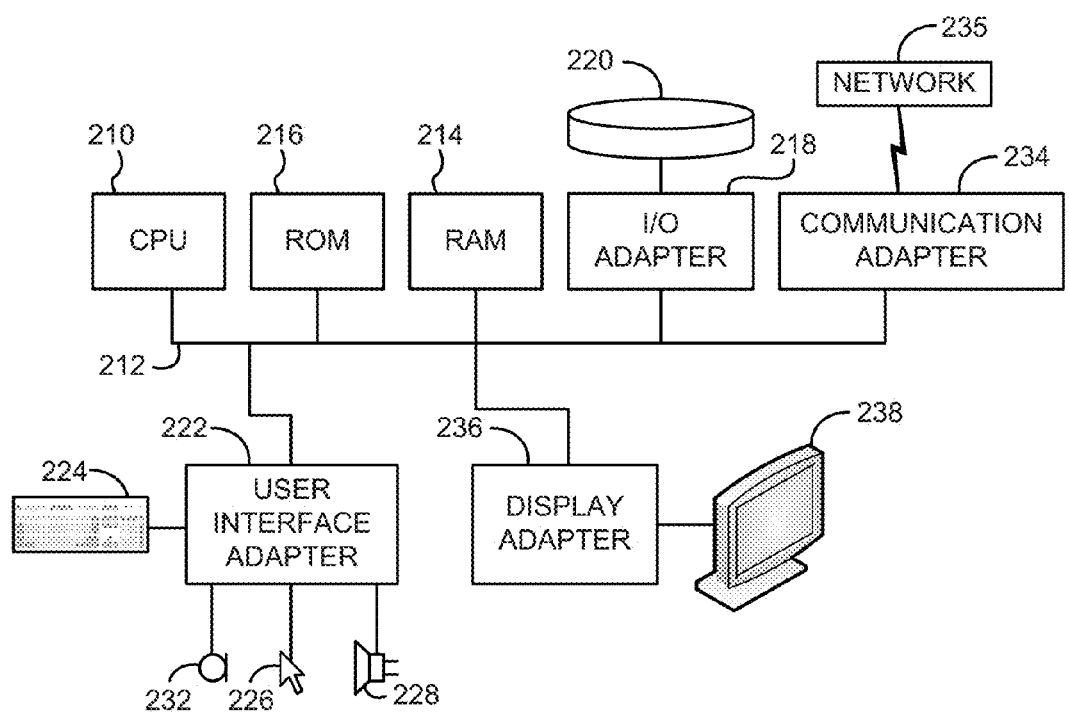
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Conventional circuit boards experience greater signal and insertion losses the longer the traces of their design are. Furthermore, conventional circuit boards have become crowded with additional buffer devices required to make up for these losses. With technology today calling for smaller and smaller device sizes, circuit boards (particularly circuit boards which connect to additional circuit boards) are limited in that their male to female connector pins are restricted to coupling in a direction parallel to the axis of the pins.

Various approaches described herein utilize a high speed circuit board to circuit board connector which utilizes mating in an orthogonal direction to the axis of the pins rather than in a parallel direction. Such embodiments provide a viable solution with numerous advantages which will be described in detail below, most notably allowing for shorter traces that alleviate many of the problems described above.

Figure 3:
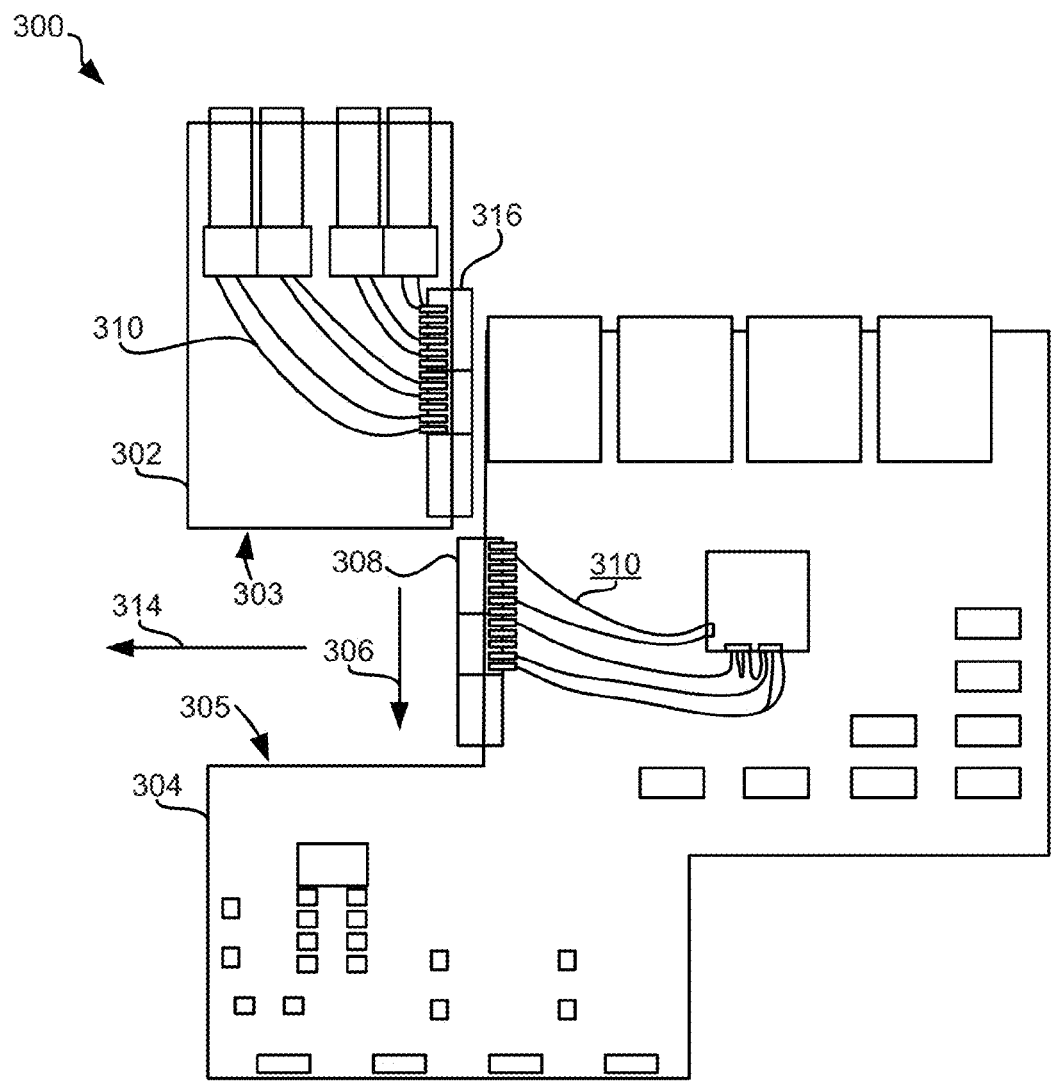
FIG. 3 illustrates a series of printed circuit boards, in accordance with one embodiment.

FIG. 3 depicts a system 300, in accordance with one embodiment. As an option, the present system 300 may be implemented in conjunction with features from any other embodiment listed herein, such as those described with reference to the other FIGS. Of course, however, such system 300 and others presented herein may be used in various applications and/or in permutations which may or may not be specifically described in the illustrative embodiments listed herein. Further, the system 300 presented herein may be used in any desired environment.

Referring now to FIG. 3, system 300 includes a printed circuit board 304. The printed circuit board 304 may have any type of circuitry thereon. In one exemplary embodiment, the circuitry may be configured to operate as at least a portion of a network switch, a controller circuit, a motherboard, etc. Unless otherwise described herein, the components of the printed circuit board 304 may have conventional construction and be fabricated by conventional methods adapted based on the present disclosure.

System 300 further includes a connector 308 coupled to the printed circuit board 304. In various embodiments, the connector 308 may be fixedly coupled to the printed circuit board 304. The connector 308 includes a plurality of pins (not shown) extending therefrom along a first direction 314. System 300 further includes traces 310.

With continued reference to traces 310 of system 300 the direction of insertion of the second printed circuit board 302 is shown by arrow 306. This direction of insertion 306 may be the only plausible direction of insertion, e.g., due to space constraints within the housing of the printed circuit board 304. By enabling coupling along direction 306, the length of the traces 310 may be made much shorter than those of conventional circuit boards that have connectors which couple in a direction parallel to the axis of the pins, where such connectors would have to be located along edges 303 and 305 of the respective circuit boards 302, 304 to enable coupling in the direction of insertion 306 thereby requiring much longer traces. Shorter traces 310 present numerous advantages to circuit board layout and performance, including (but not limited to): minimizing signal loss, improving signal integrity, reducing circuit board cost, etc. Reducing the length of traces 310 is now a circuit design option, due to the mating of male to female pins in the orthogonal direction, as described herein. Furthermore, reducing the length of traces 310 eliminates the need for additional buffer devices, which conventional circuit boards often require, in order to compensate for insertion losses (also resulting from longer trace lines).

Connector 308 may include guides (not shown) configured to guide a mating connector 316 along a second direction 306 (direction of insertion) oriented perpendicular to the first direction 314. The guides of connector 308 may include e.g. slots, channels, dovetails, etc. Furthermore, guides allow for quick attachment and detachment of a first printed circuit board 304 and a second printed circuit board 302.

System 300 further includes a second printed circuit board 302 having a mating connector 316 coupled to the second printed circuit board 302. Mating connector 316 includes a plurality of mating pins (not shown) extending therefrom along the first direction 314, and is fixedly coupled to the second printed circuit board 302. Additionally, mating connector 316 may include guides (not shown) configured to guide the mating connector 316 in the second direction 306. Guides of the mating connector 316 may include e.g. slots, channels, dovetails, etc. Mating pins may engage the pins when the connector 308 and mating connector 316 are coupled together, as will be described in greater detail below.

Unless otherwise described herein, the components of the second printed circuit board 302 and/or connectors 308, 316 may have conventional construction and be fabricated by conventional methods adapted based on the present disclosure.

According to one embodiment, the printed circuit board 304 and the second printed circuit board 302 may be configured to operate as at least a portion of a network switch when the connector 308 and mating connector 316 are coupled together.

Additionally, all mating pins (not shown) designated for receiving power may be aligned in one or more power rows oriented along the second direction 306 when the connector 308 and mating connector 316 are coupled together, as will be described in greater detail below.

Figure 4A:
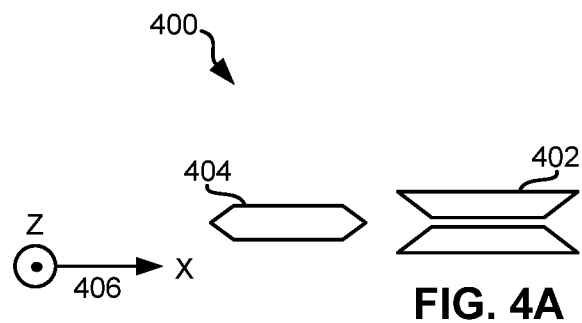
FIG. 4A-4C illustrates coupling of a male to female pin pair, in accordance with one embodiment.
Figure 4B:
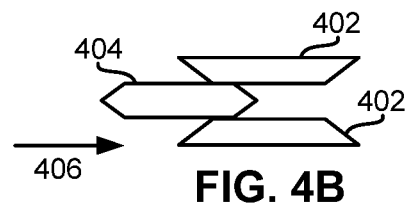
Figure 4C:
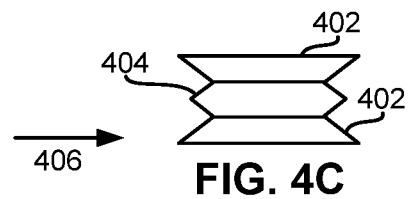

FIGS. 4A-4C depict an illustrative progression of male to female pin pair coupling in accordance with one embodiment. As an option, the present male to female pin pair 400 may be implemented in conjunction with features from any other embodiment listed herein, such as those described with reference to the other FIGS. Of course however, such male to female pin pair 400 and others presented herein may be used in various applications and/or in permutations which may or may not be specifically described in the illustrative embodiments listed herein. Further, the male to female pin pairs 400 presented herein may be used in any desired environment.

Male to female pin pair 400 include a male pin 404 and a female pin 402, e.g., of a conductive metal such as copper, aluminum, etc. Male pin 404 and female pin 402 have a pair direction 406, from left to right in a second direction (X direction), and must both be arranged horizontally (as illustrated in FIGS. 4A-4C). Pair direction 406 (X direction) of a male to female pin may also be right to left, depending on the preferred embodiment. FIG. 4A illustrates male to female pin pair 400 before coupling, e.g. there is no physical contact between male pin 404 and female pin 402.

FIG. 4B illustrates the male and female pins 404, 402 where the male pin 404 and female pin 402 are partially coupled.

FIG. 4C illustrates male to female pin pair 400 in which male pin 404 and female pin 402 are fully coupled. It should also be noted that the coupling direction 406 of the pins 402, 404 is orthogonal to the axis of the pins (axis of the pins extends into the page of FIGS. 4A-4C in a first direction Z).

Additionally, as illustrated in FIGS. 4A-4B, as a male pin 404 is inserted into female pin 402, the receptacles of female pin 402 may partially shift, separate, open, etc. to accept and sandwich the male pin 404. This shifting ensures a secure contact between the paired male pin 404 and female pin 402, as a circuit connection would require.

Furthermore, it should be noted that pin pair configurations may vary depending on the preferred embodiment. For example, pin pair configurations other than male to female pin pairs 400 may include a male pin to male pin pair, where there is a lack of female pin receptacles sandwiching a male pin. As long as there is contact between the male pin to male pin pair, or other similar embodiments, circuit board connectivity is possible.

Figure 5:
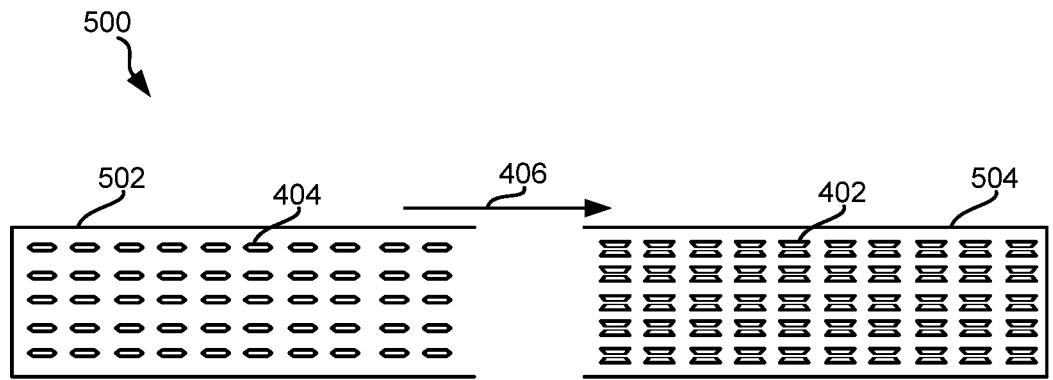
FIG. 5 illustrates a schematic of a male to female pin connector pair in accordance with one embodiment.

FIG. 5 depicts a connector pair 500, in accordance with one embodiment. As an option, the present connector pair 500 may be implemented in conjunction with features from any other embodiment listed herein, such as those described with reference to the other FIGS. Of course, however, such connector pair 500 and others presented herein may be used in various applications and/or in permutations which may or may not be specifically described in the illustrative embodiments listed herein. Further, the connector pair 500 presented herein may be used in any desired environment.

Referring now to FIG. 5, connector pair 500 includes a male pin connector housing 502 and a female pin connector housing 504. Male pin connector housing 502 includes male pins 404, and furthermore has a coupling direction 406 (as described above). Female pin connector housing 504 includes female pins 402. Male pins 404 and female pins 402 of connector pair 500 are arranged in a 5×10 array for illustrative purposes. Pin configurations/arrangements may vary depending on the desired application, number of leads, etc.

It should be noted that once male pin connector housing 502 and female pin connector housing 504 have paired together, the male pins 404 and female pins 402 will be fully paired (orthogonal to the axis of the pins) e.g., as illustrated in FIG. 4C. Additionally the male pin connector housing 502 and female pin connector housing 504 may include a bumper, stop, threshold, etc. (not shown) which ensures that the male pin 404 is sandwiched between the female pins 402 with maximum contact between the two, (e.g., a male pin 404 has not been over-inserted or under-inserted in the corresponding female pins 402).

Figure 6:
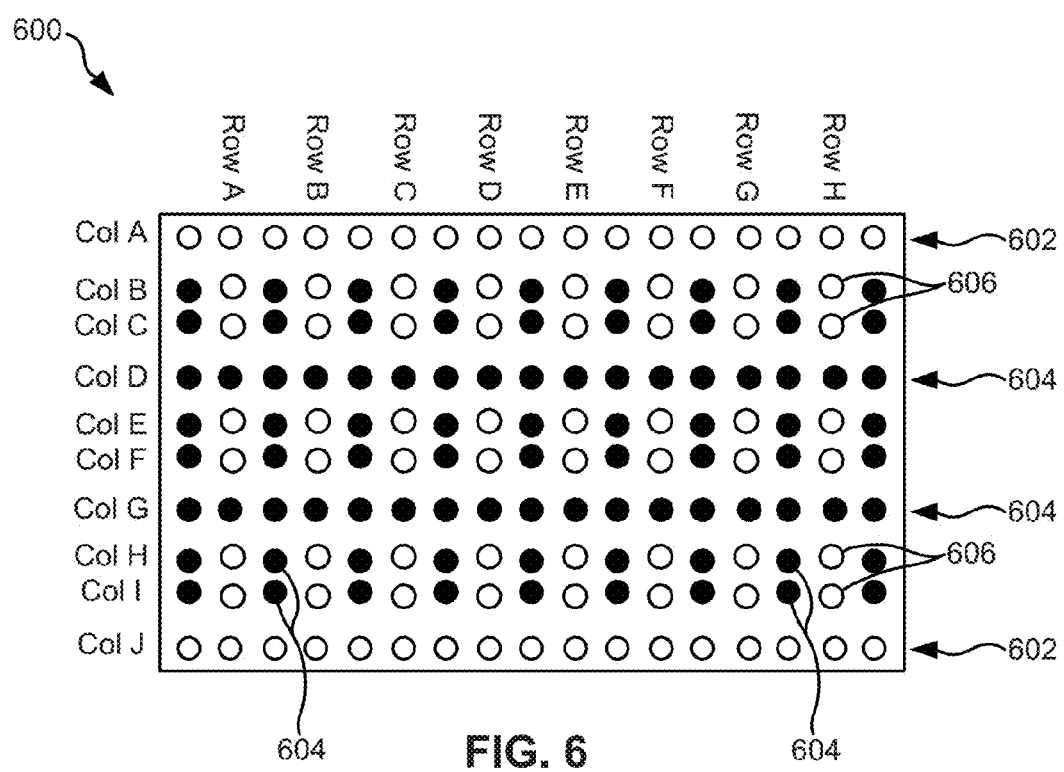
FIG. 6 illustrates a pin mapping, in accordance with one embodiment.

FIG. 6 depicts a pin mapping 600, in accordance with one embodiment. As an option, the present pin mapping 600 may be implemented in conjunction with features from any other embodiment listed herein, such as those described with reference to the other FIGS. Of course, however, such pin mapping 600 and others presented herein may be used in various applications and/or in permutations which may or may not be specifically described in the illustrative embodiments listed herein. Further, the pin mapping 600 presented herein may be used in any desired environment.

Referring now to FIG. 6, pin mapping 600 includes power pins 602 as noted by column A and column J. Pin mapping 600 further includes ground pins 604; the ground pins 604 have been colored black in order to create distinction between ground pins 604 and any other pins. Furthermore, pin mapping 600 includes differential signal pins 606 in Col B-Col I, which have been colored white in order to create distinction between the ground pins 604 (colored black) and any other pins. Note that each circle denotes a location where pin pairs are in mating contact when the corresponding connectors are fully engaged.

Columns (A-J) and rows (A-H) have been included in FIG. 6 to clarify the description of pin mapping 600. Further embodiments may include a greater or lesser number of rows/columns for descriptive purposes, depending on the pin mapping orientation.

As illustrated in FIG. 6, all pins designated for providing power may be aligned in one or more power columns (e.g., columns A and J as shown) oriented along a second direction (see 306 of FIG. 3). Furthermore, there are no other types of pins, other than power pins 602 positioned in the one or more power rows (columns A and J). Isolating power rows (columns A and J) enables hot swapping of circuit boards. Hot swapping capabilities provide numerous advantages to a circuit board including (but not limited to) limiting electrical arcing at the power pins 602, protecting circuit board components from burnout, allowing quick connect and disconnect of a second circuit board to a first circuit board (e.g., as briefly described in FIG. 3), etc.

Hot swapping between two circuit boards is made possible by the isolation of power pins in the one or more power rows (columns A and J). This configuration ensures that all power pins are isolated from both ground and signal pins during the hot swap. In the event that a power pin was to come in contact with a signal pin, circuit board components could potentially be damaged or destroyed. The risk of this happening is eliminated in the isolation of power pins e.g., as illustrated by pin mapping 600.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
    a printed circuit board; and
    a connector coupled to the printed circuit board,
    a plurality of pins extending from the connector, axes of the pins extending from the connector along a first direction,
    the connector having guides configured to guide a mating connector along a second direction oriented perpendicular to the first direction,
    wherein the pins are elongated in the second direction;
    a second printed circuit board having the mating connector coupled thereto, wherein the mating connector has a plurality of mating pins extending therefrom along the first direction, the mating pins engaging the pins when the connector and mating connector are coupled together, wherein the mating pins are elongated in the second direction.

2. The system of claim 1, wherein the pins have flat sides extending along the second direction.

3. The system of claim 1, wherein all pins designated for providing power are aligned in one or more power rows oriented along the second direction, there being no other type of pins in the one or more power rows.

4. The system of claim 1, wherein the printed circuit board is configured to operate as at least a portion of a network switch.

5. The system of claim 1, comprising a second printed circuit board having the mating connector coupled thereto.

6. The system of claim 5, wherein the mating connector has a plurality of mating pins extending therefrom along the first direction, the mating pins engaging the pins when the connector and mating connector are coupled together, wherein the mating pins are elongated in the second direction.

7. The system of claim 6, wherein all mating pins designated for receiving power are aligned in one or more power rows oriented along the second direction when the connector and mating connector are coupled together, there being no other type of pins in the one or more power rows.

8. The system of claim 6, wherein the mating pins shift to receive the pins, thereby sandwiching the pins therebetween.

9. The system of claim 6, wherein the guides are physically configured to guide the pins into direct electrical contact with mating pins of a mating connector during a relative movement of the connector in the second direction with respect to the mating connector.

10. The system of claim 5, wherein the printed circuit board and the second printed circuit board are configured to operate as at least a portion of a network switch when the connector and mating connector are coupled together.

11. The system of claim 5, wherein the mating connector is fixedly coupled to the second printed circuit board.

12. A method for using the system of claim 1, the method comprising:
    creating a relative sliding motion only along the second direction between the connector coupled to the printed circuit board and a mating connector coupled to a second printed circuit board, the mating connector having a plurality of mating pins extending therefrom along a third direction oriented parallel to the first direction,
    wherein the relative sliding motion along only the second direction creates an electrical coupling between the pins and mating pins.

13. The method of claim 12, wherein the pins and mating pins slide in and out of contact with each other during the relative sliding motion.

14. The method of claim 12, wherein the mating pins shift to receive the pins during the relative sliding motion in the second direction only, thereby sandwiching the pins between the mating pins.

15. The method of claim 12, wherein guides of the mating connector also only allow the connector and mating connector to slide relative to one another in the second direction.

16. A system, comprising:
    a printed circuit board; and
    a connector fixedly coupled to the printed circuit board,
    the connector having a plurality of pins protruding therefrom along a first direction,
    the connector having guides configured to guide a mating connector along a second direction oriented perpendicular to the first direction,
    wherein the mating connector has a plurality of mating pins protruding therefrom along the first direction, the mating pins engaging the pins when the connector and mating connector are coupled together,
    a second printed circuit board having the mating connector coupled thereto,
    the connector and mating connector being coupled together,
    wherein the printed circuit board and the second printed circuit board are configured to operate as at least a portion of a network switch when the connector and mating connector are coupled together.

17. The system of claim 16, wherein all pins designated for providing power are aligned in one or more power rows oriented along the second direction, there being no other type of pins in the one or more power rows.

18. The system of claim 16, wherein the guides are physically configured to guide the pins into direct electrical contact with the mating pins of the mating connector during a relative movement of the connector in the second direction with respect to the mating connector.

19. The system of claim 16, wherein the mating connector is fixedly coupled to the second printed circuit board.

20. The system of claim 16, wherein the mating pins shift to receive the pins, thereby sandwiching the pins therebetween.

* * * * *